Feb. 8, 1955   B. N. REIME ET AL   2,701,440
ACTUATOR FOR VARIABLE INLET COWL FOR PULSE JETS
Filed April 19, 1948   2 Sheets-Sheet 1

INVENTORS:
Bert N. Reime,
Jarren H. Schmidt,
Eugene B. Walter,
By Carr & Carr & Gravely
THEIR ATTORNEYS.

Feb. 8, 1955   B. N. REIME ET AL   2,701,440
ACTUATOR FOR VARIABLE INLET COWL FOR PULSE JETS
Filed April 19, 1948   2 Sheets-Sheet 2

United States Patent Office 2,701,440
Patented Feb. 8, 1955

2,701,440
ACTUATOR FOR VARIABLE INLET COWL FOR PULSE JETS

Bert N. Reime, Ferguson, James H. Schmidt, Kirkwood, and Eugene B. Walter, Overland, Mo., assignors to McDonnell Aircraft Corporation, St. Louis, Mo., a corporation of Maryland Application April 19, 1948, Serial No. 21,908

4 Claims. (Cl. 60—35.6)

This invention relates to pulse jet engines and is more particularly directed to a device for regulating the effective area for the inlet valve therefor.

The object of the invention is to provide means to control the effective area of the cowl or inlet duct for the inlet valve of a pulse jet engine.

Figure 1:
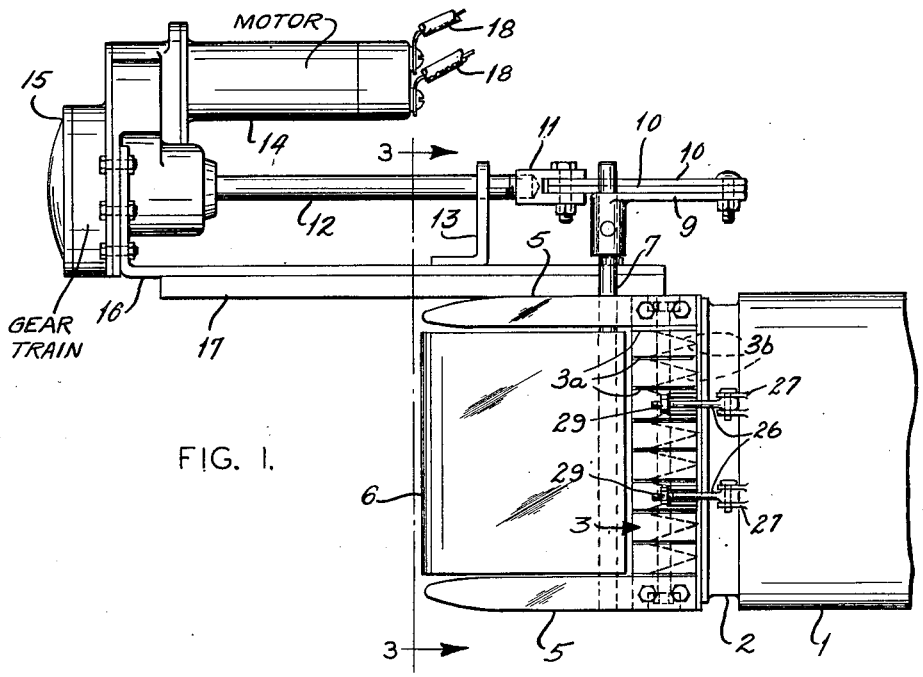
Figure 2:
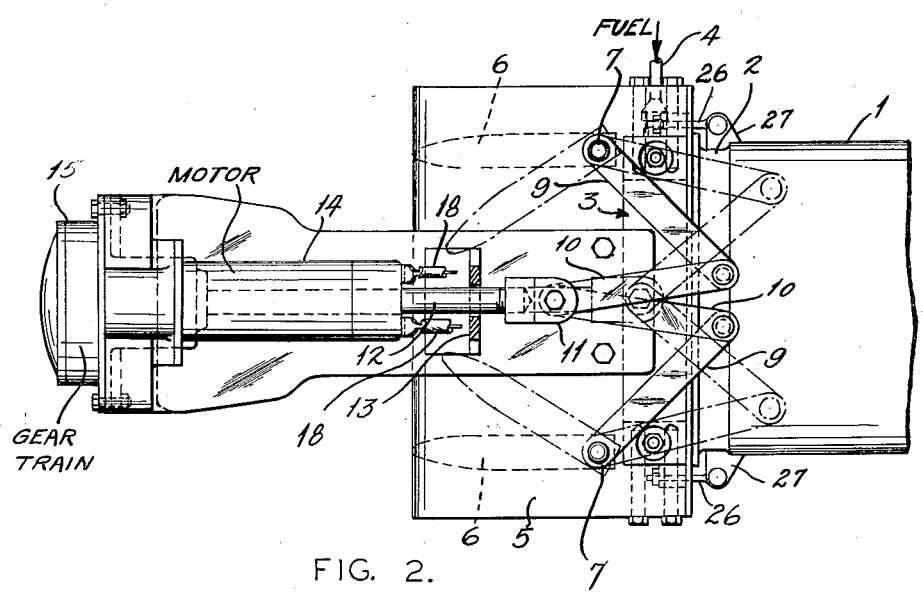
Figure 3:
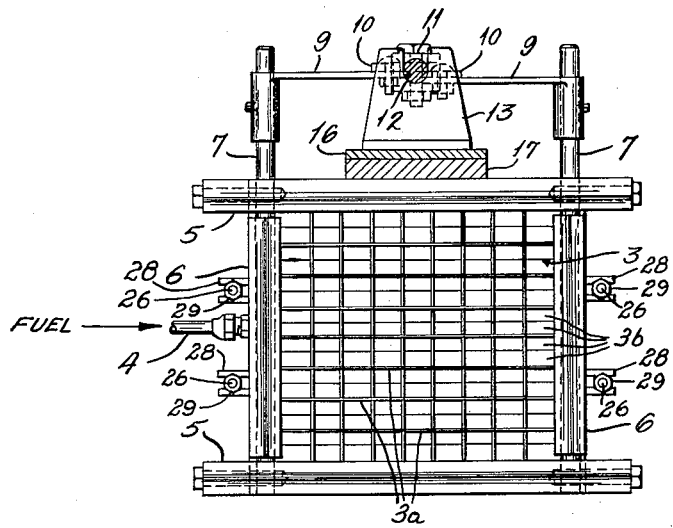
Figure 4:
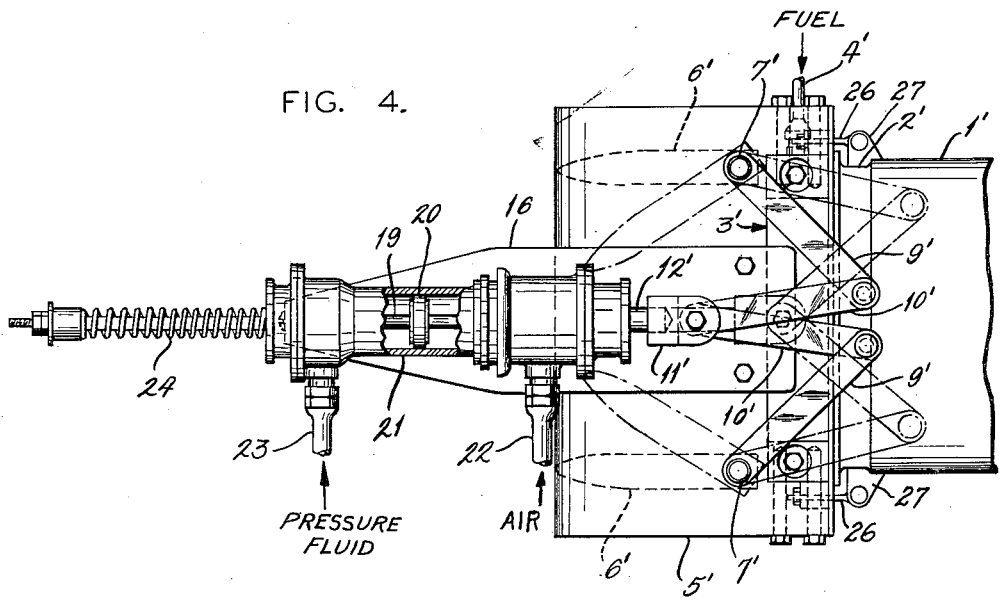

In the drawings:
Fig. 1 is a side elevational view of a device incorporating the invention,
Fig. 2 is a plan view thereof,
Fig. 3 is a sectional view taken substantially along the line 3—3 of Fig. 1; and
Fig. 4 is a plan view of a modification of the structure shown in Figs. 1–3.

It has been discovered that improved fuel economy, optimum engine performance and an increased range of operations can be obtained in pulse jet engines at the various speeds and altitudes in which they operate by regulating the inlet area. The mechanism disclosed illustrate means for achieving this result. The invention is disclosed in the several views of the drawings in which the numeral 1 designates the combustion chamber portion of a pulse jet engine having a bulkhead 2 formed thereon to which a pressure opened and closed vane type valve 3 is secured. Fuel is supplied to the engine through a conduit 4.

The vane type valve 3 is of well known construction, consisting in a plurality of horizontal fixed elements 3a arranged in spaced relation, and a plurality of valve reeds 3b carried by the fixed elements 3a on the trailing edges thereof relative to the direction of air flow into the engine 1. These valve reeds move automatically or resonate with the combustion cycle of the engine; that is, each explosion in the engine is followed by opening of the reeds 3b as the engine gulps a quantity of air for the next explosion. The body of the valve 3 containing the valve reeds 3b is removably attached to the bulkhead 2 by a plurality of bolts 26 pivoted in brackets 27 fixed to the bulkhead or other adjacent part and engaging bifurcated lugs 28 on the body of valve 3. Nuts 29 are threaded up on the bolts 26 against lugs 28 for assembly of the parts.

Suitably secured to the frame of the vane type valve and on opposite sides thereof are two airfoil profiled stationary members 5, 5. Pivotally mounted between these stationary members are two airfoil profiled members 6, 6, the pivoting being accomplished by pins 7, 7 extending through members 5, 5 and to which the members 6, 6 are secured. These several members constitute a frame substantially circumscribing the inlet valve 3, the movable members acting to control the effective inlet area.

The pins 7, 7 have one end of levers 9, 9 secured thereto and the opposite ends of the levers are pivotally secured to one end of levers 10, 10 whose opposite ends are pivotally connected to a cross-head 11. This cross-head is secured to a rod 12 slidably received in a bracket 13. One means found suitable for moving rod 12 in bracket 13 along the longitudinal axis of engine 1 to thereby move members 6, 6 toward or away from each other is by a reversible electric motor 14. This motor is connected to suitable reduction gearing and drive mechanism 15 so that rod 12 may be moved in the manner described. The motor 14 and gear mechanism are supported on a bracket 16 that supports the aforementioned devices, the bracket 16 being secured to a support 17 mounted on stationary member 5. A controllable power supply for motor 15 is represented by leads 18.

A modified operating means for the inlet area control is shown in Fig. 4. Similar parts have the same reference numerals applied thereto in order to facilitate an understanding of the device. These latter numerals are distinguished by a prime mark to avoid confusion with the disclosure of such parts in Fig. 2. Rod 12 is connected to rod 19 secured to piston 20 reciprocably mounted in cylinder 21. The cylinder is provided with suitable closures through which rod 19 extends.

Pressure fluid for moving piston 20 to the right, to thereby move the two pivoted members 6 toward each other, is admitted through conduit 23 which is connected to a suitable source of supply. The chamber in cylinder 21 to the right of piston 20 is connected to atmosphere through conduit 22. A spring 24 moves piston 20 to the left whenever pressure is relieved in the cylinder chamber to the left of piston 20.

What we claim is:
1. An inlet area control for a pulse jet engine comprising a bulkhead having a vane valve therein, said control including a pair of fixed airfoil members projecting forwardly from two opposite sides of the bulkhead and airfoil members pivoted to said bulkhead on opposite sides thereof and disposed between said fixed airfoil members, said airfoil members circumscribing said bulkhead; and means for pivoting said pivoted members toward and away from each other and relative to said fixed airfoil members for uniformly distributing and regulating the flow of air toward said valve.

2. An inlet area control for a pulse jet engine comprising a bulkhead having a vane valve therein, said control including means circumscribing said bulkhead which includes two pivotally mounted airfoil members movable toward and away from each other and disposed on opposite sides of said bulkhead, two fixed airfoil members disposed on opposite sides of said bulkhead and arranged so that said pivoted members are moved therebetween; and means for pivoting said pivotally mounted members toward and away from each other and relative to said fixed airfoil members for uniformly distributing and regulating the flow of air toward said valve.

3. An inlet area control for a pulse jet engine comprising a bulkhead having a vane valve therein, said control including a fixed airfoil member projecting forwardly from two opposite sides of said bulkhead and an airfoil member pivoted to each of the other two opposite sides of said bulkhead, said pivoted members disposed between said fixed airfoil members and movable therebetween, said airfoil members arranged so as to circumscribe said bulkhead; and a pressure fluid motor for pivoting said pivoted members toward and away from each other and relative to the fixed members for uniformly distributing and regulating the flow of air toward said valve.

4. An inlet air control for a pulse jet engine comprising a bulkhead having a vane valve therein, said control including means circumscribing said bulkhead which includes two fixed airfoil members and two pivotally mounted airfoil members, said fixed airfoil members disposed on opposite sides of said bulkhead and projecting forwardly, said pivotally mounted airfoil members disposed between and movable relative to said fixed airfoil members; and electrically operated mechanism for pivoting said pivotally mounted members toward and away from each other and relative to said fixed airfoil members for uniformly distributing and regulating the flow of air toward said valve.

References Cited in the file of this patent

UNITED STATES PATENTS

| Number | Name | Date |
|---|---|---|
| 715,758 | Cooper | Dec. 16, 1902 |
| 2,142,601 | Bleecker | Jan. 3, 1939 |
| 2,320,007 | Otto | May 25, 1943 |
| 2,375,432 | Miller et al. | May 8, 1945 |
| 2,397,654 | Forsyth | Apr. 2, 1946 |
| 2,411,895 | Poole | Dec. 3, 1946 |
| 2,481,330 | Neale | Sept. 6, 1949 |
| 2,496,351 | Mazzoni | Feb. 7, 1950 |
| 2,505,757 | Dunbar et al. | May 2, 1950 |
| 2,514,248 | Lombard et al. | July 4, 1950 |
| 2,548,430 | Goddard | Apr. 10, 1951 |

FOREIGN PATENTS

| Number | Country | Date |
|---|---|---|
| 580,995 | Great Britain | Sept. 26, 1946 |